United States Patent Office 2,697,111
Patented Dec. 14, 1954

2,697,111

STABILIZATION OF FATS AND OILS WITH TETRA-OXY DERIVATIVES OF BIPHENYL

Alan Bell and M B Knowles, Kingsport, Tenn., assignors to Eastman Kodak Company, Rochester, N. Y., a corporation of New Jersey No Drawing. Application March 1, 1952,
Serial No. 274,492

2 Claims. (Cl. 260—398.5)

This invention relates to the stabilization of fats, oils and other organic materials subject to deterioration employing compounds as antioxidants which are 2,5,2',5'-tetraoxy-4,4'-dialkyl or 4,4'-di alkoxy derivatives of biphenyl.

U. S. Patent 1,993,771 discloses the employment of compounds having the formula HO—R—R'—Y, in which R and R' are aryl nuclei which may be alike or different, and Y is hydrogen or hydroxyl, as preserving agents for animal and vegetable fats, fatty oils, and soap. U. S. 2,324,186 discloses the employment of organic compounds having the general formula R'—R(OH)$_2$ where R and R' are distinct but directly connected aromatic hydrocarbon groups as antioxidants for rubber and other unsaturated organic substances which tend to deteriorate by absorption of oxygen such as gums; fatty oils, soaps, etc. U. S. 2,479,948, discloses the employment of 4,4'-dihydroxy-3,3',5,5'-tetraalkyl derivatives of biphenyl as stabilizing agents for hydrocarbons such as cracked gasoline as well as for organic compounds in general including cottonseed oil, animal oils, fish oils, fats, soaps, etc. None of these patents disclose the employment of tetraoxy-dialkyl or dialkoxy derivatives of biphenyl.

Chang and Gisvold, J. Am. Pharm. Assoc., 38, 584 (1949) describe the antioxidant effect of 2,2',3,3'-tetrahydroxy-5-5'-dialkylbiphenyl derivatives which can be represented by the following formula:

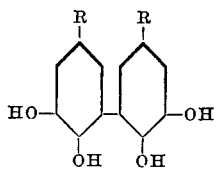

where R represents an alkyl radical.

We have now found that fats, oils and other organic materials subject to deterioration can be stabilized with antioxidants having the following formula:

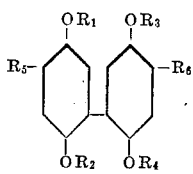

wherein three of R$_1$, R$_2$, R$_3$ and R$_4$ each represents a substituent selected from those consisting of a hydrogen atom and a lower alkyl radical containing from 1 to 8 carbon atoms and one of R$_1$, R$_2$, R$_3$ and R$_4$ represents a hydrogen atom and R$_5$ and R$_6$ each represents a substituent selected from the group consisting of alkoxy radicals containing from 1 to 8 carbon atoms and primary, secondary and tertiary alkyl radicals containing from 1 to 8 carbon atoms. Examples of such alkyl radicals include methyl, ethyl, propyl, tertiary butyl, hexyl, tertiary octyl, etc. Examples of such alkoxy radicals include methoxy, ethoxy, propoxy, tertiary butoxy, hexoxy, etc. Examples of compounds having the above formula include 2,2',5,5'-tetrahydroxy-4,4'-dimethoxy-biphenyl, 2,2',5,5'-tetrahydroxy-4,4'-dimethylbiphenyl, 2,2'-dihydroxy-5,5'-dimethoxy-4,4'-dimethylbiphenyl, 2,2',5,5'-tetrahydroxy-4,4'-ditertiary-butylbiphenyl, etc., 2,2'-dihydroxy-5,5'-dimethoxy-4,4'-ditertiary-butylbiphenyl, 2,2'-dihydroxy-5,5'-dipropoxy-4,4'-ditertiary-butylbiphenyl, 2,2',5,5'-tetrahydroxy-4,4'-ditertiary-octylbiphenyl, etc.

It is apparent that the compounds of our invention differ in one regard from those of Chang et al. in that they can be considered to be derivatives of hydroquinone whereas Chang's compounds can be considered to be derivatives of catechol. Moreover, in addition to the more advantageous positions of the substituents regarding antioxidant properties, it is apparent that the hydroxy groups can advantageously be alkoxy and that the alkyl groups can likewise advantageously be alkoxy.

It is an object of our invention to provide a novel class of antioxidants possessing improved properties which are particularly useful in the stabilization of fats and oils. A further object of our invention is to provide a process whereby such antioxidants can be employed in the stabilization of organic materials subject to deterioration such as fats and oils. A still further object of our invention is to provide compositions of matter comprising mixtures of such antioxidants with fats and oils which compositions are highly resistant to deterioration. Other objects will become apparent elsewhere herein.

The compounds of this invention are not novel as a broad class although certain of the specific compounds are not known to have been described heretofore. The following literature references disclose the preparation of some of the compounds covered by the generic formula given above.

Nietzki (Ann., 215, 161 (1882)), oxidized toluhydroquinone dimethyl ether with potassium dichromate to give a quinone which when reduced had either Formula I or II.

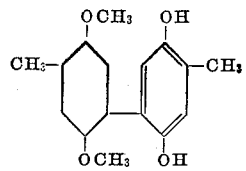

I

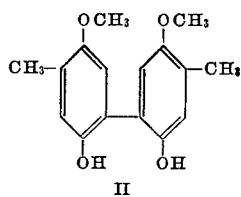

II

Nietzki and Bernard (Ber., 31, 1334 (1898)), oxidized toluhydroquinone dimethyl ether with potassium dichromate to obtain a quinone which upon further oxidation with nitric acid gave III. This latter compound was reduced to the corresponding hydroquinone derivative, IV.

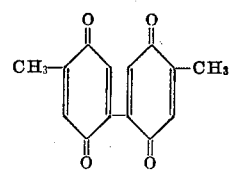

III

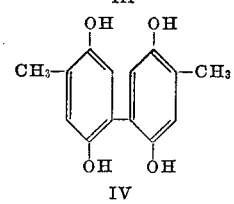

IV

Brunner (Monatsh., 10, 174), oxidized toluhydroquinone with manganese dioxide in glacial acetic acid to obtain a "coupled" product of either structure V or VI.

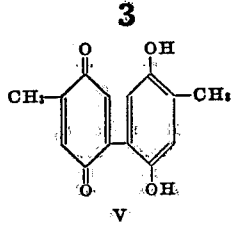

V

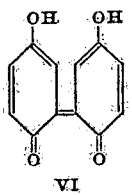

VI

Erdtman (proc. Roy. Soc., London, A143, 191 (1933)), oxidized methoxy hydroquinone with ferric chloride to obtain a coupled product which have structure VII upon reduction.

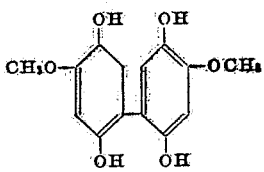

Posternak, Alcalay, Luzzoti, and Tardent (Helv. Chim. Acta, 31, 525 (1948)), oxidized 3-methyl-4-methoxy-phenol with ferric chloride to obtain structure VIII. This latter compound gave III when oxidized with nitric acid. They also reacted tolyhydroquinone with toluhydroquinone dimethyl ether in the presence of aluminum chloride to obtain what was described as IX and X. Structure IX is reduced to a compound identical with the reduced form I or II. (The correct structure has not been ascertained and there is good substantiating evidence for both.)

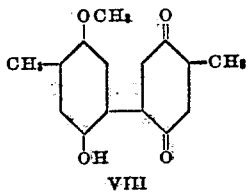

VIII

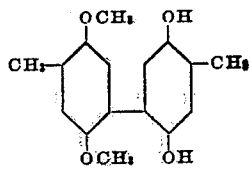

IX

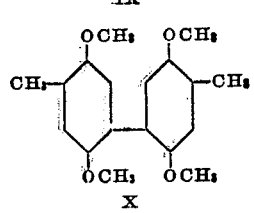

X

The compound 2,2',5,5' tetrahydroxy-4,4'-ditertiary-butyl biphenyl appears to be novel and not disclosed in the prior art. This compound was found to be capable of preparation in accordance with the following procedure:

Example 1

A solution of 50 parts of crude 3-tert-butyl-4-methoxyphenol in 280 parts of 90 percent acetic acid was treated with 60 parts of 35 percent nitric acid solution. After a few minutes, a vigorous reaction set in and a golden yellow, crystalline solid separated. This solid was collected on a filter. The filtrate contained a large quantity of tert-butylquinone. A yield of 14 parts (30.8 percent) of product, melting near 200° C. with decomposition, was obtained. The preceding oxidation product was reduced in a Parr apparatus using 1,4-dioxane as solvent and Raney nickel as catalyst. The catalyst was filtered off and the filtrate diluted with water which caused a white solid to separate. It was collected on a filter and then recrystallized three times from benzene. Determination of purity by means of melting point determination was difficult since the material was polymorphic. It melted near 180° C., recrystallized at 185° C., and remelted at 204° C.

The compounds described hereinabove and covered by the generic formula disclosed are useful as antioxidants in fats, vegetable oils, rubber, plastics, etc., and can also be employed in the stabilization of the carotene content of alfalfa. While these antioxidants have been found to be particularly suitable for use in fats and oils, they also constitute satisfactory stabilizing agents for use in organic compounds in general, particularly petroleum products, e. g. gasoline, turbine oils, hydrocarbons, etc., unsaturated materials which have been polymerized, e. g. acrylic acid ester polymers, methacrylate polymers, polyvinyl compounds, polystyrene, etc., oils, e. g. animal oils, lanolin, fish oils, such as sperm oils, corn oil, cottonseed oil, peanut oil, soyabean oil, etc., fats, e. g. lard, butter, etc., rubber, hydrocarbon polymers, turpentine, terpenes, etc., etc.

When employed as antioxidants, fractions of a percent of the antioxidants covered by the generic formula can be incorporated into such substrate materials as lard, cottonseed oil, peanut oil, soyabean oil, etc., by admixing such antioxidants with the fats or oils whereby a solution or suspension of the antioxidant in the substrate is obtained. Alternatively, the antioxidant can be blended with suitable solvents to form an antioxidant solution which can then be advantageously admixed with the substrate. Examples of solvents for such solutions include glycerin, propylene glycol, etc. Such antioxidant solutions can be more readily dissolved in the fat or oil to be stabilized with less necessity for prolonged mixing of the fat or oil with the undissolved antioxidant. Similarly, synergists can be admixed with the fats or oils along with the pure antioxidant compounds of this invention or, in order to facilitate the incorporation of the antioxidant and synergist into the fat or oil, they can both be dissolved in such solvents as hexane, propylene glycol, glycerin, or other similar solvents which are inert insofar as concerns both the antioxidant and/or the synergist components in the ultimately prepared stabilized fat or oil. Examples of synergists which can be employed include citric acid, tartaric acid, phosphoric acid, ascorbic acid, etc.; other synergists can also be employed. In addition to the presence of a single antioxidant of the above generic formula in the fat or oil, it is possible to employ two or more of such antioxidants simultaneously; moreover, such antioxidants either alone or in combination can be employed together with other antioxidants which are known in the prior art which can be added for their supplemental effects if such be desired.

In addition to the fats and oils mentioned above which can be stabilized by the antioxidants of our invention, other representative fats and oils include linseed oil, menhaden oil, cod liver oil, castor oil, olive oil, rape seed oil, cocoanut oil, palm oil, sesame oil, babassu oil, beef tallow, etc., as well as hydrogenated oils and fats prepared from any of the foregoing. Furthermore, various other oils and fats may be similarly treated within the scope of the present invention.

Inasmuch as it is well known in the art to employ antioxidants in the stabilization of fats and oils, it is not believed necessary to give numerous specific examples of how the antioxidants of this invention are blended with the fats or oils nor specific proportions which can be employed. The methods of blending antioxidants and synergists with particular fats and oils can be readily determined by those skilled in the art. The range of antioxidant proportions which can be employed is from about 0.001 percent up to as much as 1.0 percent or more by weight of the antioxidants of this invention in the substrate depending upon the effects desired. Generally, a range of proportions of from about 0.001 percent up to about 0.1 percent is advantageous with the upper limit being fully satisfactory if it does not exceed 0.05 percent. When solvents are employed in preparing antioxidant solutions, such solvents can be present in an amount just sufficient to dissolve the antioxidant up to any larger amount which may be desired, especially if larger amounts are necessary to fully dissolve other supplementary antioxidants and/or synergists which may be incorporated into the antioxidant solution. The following tabulation of data is presented in order to further illustrate our invention and show some of the properties of some of the antioxidants covered by this invention. Data are also presented in this tabulation regarding "BHA" which is made up of a mixture of the isomers 2-tertiary butyl-4-methoxyphenol and 3-tertiary butyl-4-methoxyphenol and "N. D. G. A." which is nordihydroguaiaretic acid. Both BHA and N. D. G. A. are well known antioxidants which are commercially available. The presentation of these known antioxidants in the tabulation shows the advantage of the compounds of this invention over the prior art.

only two antioxidants of this invention tested in peanut oil do not compare so favorably with N. D. G. A. in the same oil. In regard to lard, N. D. G. A. is superior to only one compound out of the four compounds of this invention compared therewith and that superiority is not especially significant. Based on this data, it is clearly apparent that the compounds of this invention are quite effective antioxidants for fats and oils such as lard, cottonseed oil, peanut oil and soyabean oil and that they are markedly superior to BHA in every instance tested and to N. D. G. A. in many of the instances tested.

In addition to the specific compounds of the above generic formula which have been presented in the tabulation and thereby illustrated in accordance with this invention, it is obvious that other derivatives such as those named hereinbefore could be employed.

| Compound | Concentration, percent | | Lard | P. F. | AOM keeping quality in hours | | | | | | | | | | | | | | | |
|---|---|---|---|---|---|---|---|---|---|---|---|---|---|---|---|---|---|---|---|---|
| | | | | | Cottonseed oil | | | | | | Peanut oil | | | | | | Soyabean oil | | | | |
| | Antioxidant | Citric acid | | | 20 | P. F. | 70 | P. F. | 100 | P. F. | 20 | P. F. | 70 | P. F. | 100 | P. F. | 20 | P. F. | 70 | P. F. | 100 | P. F. |
| Blank (control) | 0 | 0 | 4.5 | | 1.0 | | 7.0 | | 9.5 | | 2.5 | | 9.5 | | 10.5 | | 1.5 | | 4.5 | | 6.0 | |
| 2,2′,5,5′-tetrahydroxy-4,4′-dimethoxy biphenyl | {0.005 .01 .01 | 0.005 | 104.0 | 23.1 | 10.0 13.0 13.5 | 10.0 13.0 14.0 | 16.0 20.0 20.5 | 2.3 2.9 2.9 | 18.0 21.5 23.0 | 1.9 2.3 2.4 | 4.0 7.0 11.5 | 1.6 2.8 4.6 | 14.0 15.5 21.0 | 1.5 1.6 2.2 | 15.5 17.0 22.0 | 1.5 1.6 2.1 | | | | | | |
| 2,2′,5,5′-tetrahydroxy-4,4′-dimethyl biphenyl | .01 | | 128 | 28.4 | 28.0 | 28.0 | 42.0 | 6.0 | 44.5 | 4.7 | | | | | | | | | | | | |
| 2,2′-dihydroxy-5,5′-dimethoxy-4,4′-dimethyl biphenyl | .01 | | 25.5 | 5.7 | 12.0 | 12.0 | 19.5 | 2.8 | 22.0 | 2.3 | | | | | | | | | | | | |
| 2,2′,5,5′,-tetrahydroxy-4,4′-di-tert-butyl biphenyl | .01 | | 91.5 | 20.3 | 24.5 | 24.5 | 36.5 | 5.2 | 39.5 | 4.2 | 8.0 | 3.2 | 17.0 | 1.8 | 17.5 | 1.7 | 13.0 | 8.7 | 17.0 | 3.8 | 19.0 | |
| BHA | .01 | | 17.0 | 3.8 | 1.2 | 1.2 | 6.0 | | 8.5 | | | | | | | | | | | | | |
| N. D. G. A. | .01 | | 45.0 | 10.0 | 4.0 | 4.0 | 10.0 | 1.4 | 12.0 | 1.3 | 7.5 | 3.0 | 24.5 | 2.6 | 27.0 | 2.6 | | | | | | |

The data presented above is based on tests conducted under the same conditions employing similar samples in each instance of lard, cottonseed oil, peanut oil and soyabean oil; the numbers under the headings for several of these columns such as cottonseed oil "20" represents the peroxide value of the oil in conjunction with the AOM test. The AOM figures are in hours; the initials P. F. represent the protection factor which is the ratio of the AOM value of the stabilized substrate to that of the control which contains no antioxidant. The procedure employed under the AOM (active oxygen method) is well known in the antioxidant art and need not be explained in this specification. The data in this table represents the equivalent of 37 separate working examples, each disclosing the admixture of a certain antioxidant in a certain proportion in a substrate consisting of the various fats and oils or types thereof listed in the table.

It is clear from the tabulated data that the compounds of this invention are excellent antioxidants for lard, cottonseed oil, peanut oil and soyabean oil. The compounds of this invention are clearly superior to BHA in both lard and cottonseed oil; no comparative tests were made in peanut oil or soyabean oil. The compounds of this invention are generally markedly superior to those of N. D. G. A. in lard and in cottonseed oil; however, the

What we claim as our invention and desire to secure by Letters Patent of the United States is:

1. A stabilized product comprising a substrate selected from the group consisting of fats and fatty oils, containing from about 0.001% and 1.0% by weight of an antioxidant which is 2,2′,5,5′-tetrahydroxy-4,4′-ditertiary butylbiphenyl.

2. A process for stabilizing and inhibiting the deterioration of fats or fatty oils which comprises admixing a substrate material selected from the group consisting of fats and fatty oils with from about 0.001% to about 0.1% by weight based on the substrate of 2,2′,5,5′-tetrahydroxy-4,4′-ditertiary butylbiphenyl.

References Cited in the file of this patent

UNITED STATES PATENTS

| Number | Name | Date |
|---|---|---|
| 2,591,651 | Young | Apr. 1, 1952 |

OTHER REFERENCES

Chang et al.: Jour. Am. Pharm. Assoc., November 1949, pages 584–585.